(No Model.) 2 Sheets—Sheet 1.

D. C. MARKHAM.
HARROW.

No. 428,310. Patented May 20, 1890.

Witnesses
Jos. H. Blackwood
W. G. Doolittle

Inventor
Dewitt C. Markham
By his Attorneys
Wm. H. Doolittle

THE NORRIS PETERS CO., PHOTO-LITHO., WASHINGTON, D. C.

(No Model.) 2 Sheets—Sheet 2.
D. C. MARKHAM.
HARROW.
No. 428,310. Patented May 20, 1890.
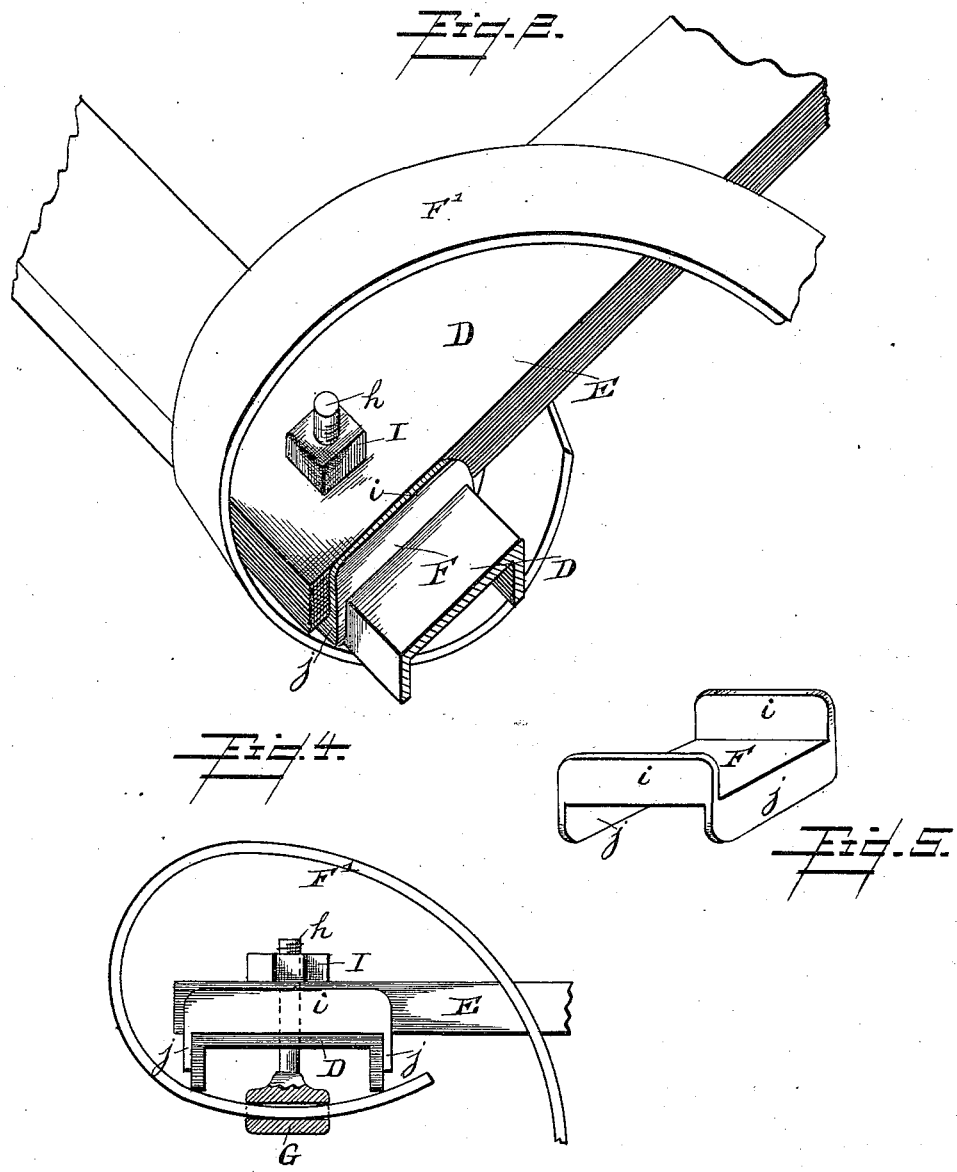

UNITED STATES PATENT OFFICE.

DEWITT C. MARKHAM, OF COLLINSVILLE, ASSIGNOR, BY MESNE ASSIGNMENTS, TO WARREN M. BRINKERHOFF, OF AUBURN, NEW YORK.

HARROW.

SPECIFICATION forming part of Letters Patent No. 428,310, dated May 20, 1890.

Application filed September 14, 1889. Serial No. 323,931. (No model.)

*To all whom it may concern:*

Be it known that I, DEWITT C. MARKHAM, a citizen of the United States, residing at Collinsville, in the county of Lewis and State of New York, have invented certain new and useful Improvements in Harrows; and I do hereby declare the following to be a full, clear, and exact description of the invention, such as will enable others skilled in the art to which it appertains to make and use the same.

My invention relates to the construction of harrows, and particularly to that class of harrows in which curved spring-teeth are employed.

The harrow to which my improvements are applied is of the character shown and described in my patent, No. 405,580, of June 18, 1889, which is a double harrow, the sections of which are connected by front and rear hinges; and my present invention consists of changes in the manner of mounting the teeth, in the form of the rear hinge, and in the mode of connecting the draw-bars at the front of the harrow to the draft-bars, all as hereinafter described and claimed.

My invention is illustrated in the accompanying drawings, in which—

Figure 1:
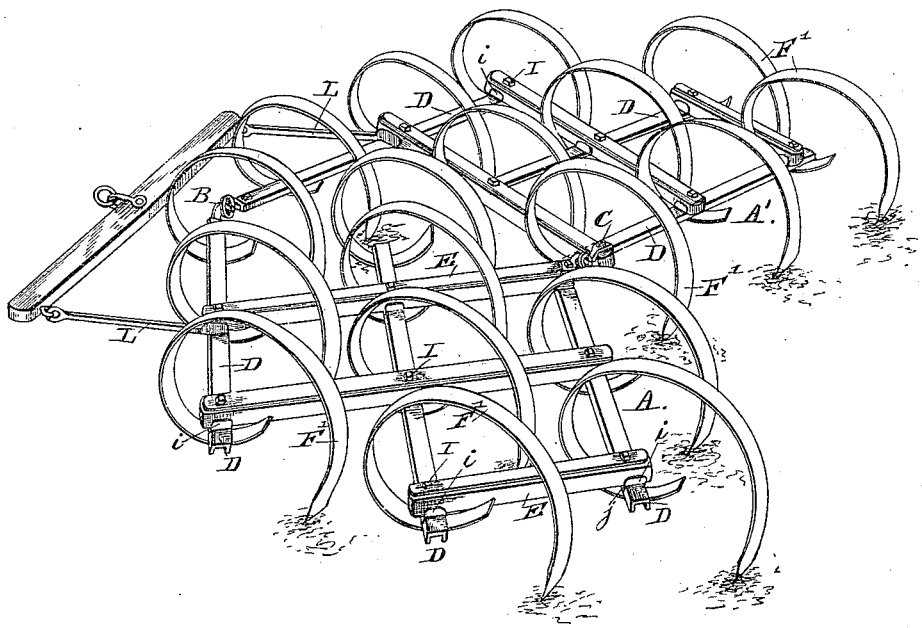
Figure 2:
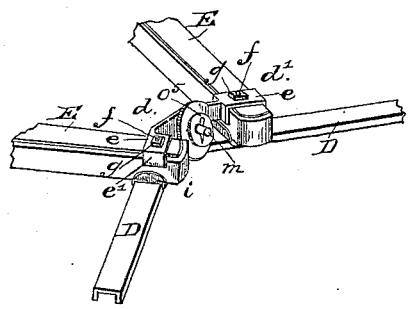

Figure 1 is a perspective view of a harrow with my improvements attached; Fig. 2, a detail showing the mode of attachment of a curved tooth to a draft-bar; Fig. 3, a detail showing form and mode of attachment of rear hinge; Figs. 4 and 5, details.

Referring to the drawings, A A' are the separate sections of a double harrow united by front and rear hinges B C.

D are channel draft-bars, made, preferably, of steel, and E are the cross-beams made preferably, of oak. The cross-beams are mounted crosswise on the channel-bars, and at their points of intersection the cross-beam, draft-bar, saddle, and curved tooth are united by a clip, and in the following manner: A saddle F, provided with upper lugs $i$ and lower lugs $j$, the latter at right angles to the former, is placed on the upper flat surface of the channel draft-bar with the lugs $j$ projecting down and closely hugging the sides of the draft-bar, and the cross-beam E is then placed on the saddle between the lugs $i$. The shank of a spring-tooth F, inclosed by a clip G, is then laid diagonally on the plain edges of the draft-bar, the screw-threaded clip-bolt $h$ inserted through the draft-bar, saddle, and cross-beam, and the whole then screwed tightly and solidly together by means of a nut I.

Another form of clip or holding means may be used, the essential features of this part of my invention being that at the points of intersection of the draft bars and beams the tooth shall be held solidly against the edges of the draft-bars by suitable means connecting the bars and beams and engaging the tooth between the edges of the draft-bars.

The front hinge B corresponds to the front hinge M in my said patent, No. 405,580, and further description is therefore unnecessary. The rear hinge C differs from the rear hinge in said patent in that it is not provided with a saddle in which the cross-beam is placed; but each part $d\ d'$ is provided with a strap or plate $e$, provided with downwardly-projecting lugs $e'$. The strap $e$ is put on the top of the cross-beam with the lugs abutting against the sides of the beam and a bolt $f$ put through beam and strap and secured by a nut $g$. By thus putting a plate or strap on top of the beam I dispense with the use of a washer under the nut. As in said patent, one part $d$ is provided with a post $m$ and the part $d'$ with a slot to hold the post, and has a washer $o^5$ and a spring-pin to hold the hinge-sections together.

L L are draw-irons, each hung at one end of the whiffletree and at the other end bolted to a channel draft-bar; or it may be cast to saddle F.

Having thus described my invention, what I claim is—

1. In combination, channel draft-bars, cross-beams, saddles F, placed between the said draft bars and beams on which the beams are mounted, and spring-teeth mounted on the under side of said draft-bars, all secured together by a bolt and nut and clip G, substantially as described.

2. In combination with the channel draft-bars, cross-beams, and saddles between the cross-beams and draft-bars, the draw-irons secured to said draft-bars or saddles, substantially as described.

3. In combination, channel draft-bars, cross-beams, saddles placed between the said draft-bars and beams, spring-teeth mounted on the under side of said draft-bars, and the fastening-clip with bolt and nut for holding the teeth to the frame and securing the parts together, substantially as described.

4. In combination, channel draft-bars, cross-beams, the saddle placed between the said draft bars and beams, spring-teeth mounted at the intersection of the bars, and the fastening-clips with the bolts and nuts for holding the teeth to the frame and securing the parts together, substantially as described.

5. In a harrow, the combination, with a channel draft-bar having its upper surface in substantially a single plane, of a curved spring harrow-tooth engaging the channel draft-bar on the under side, and an encircling clip having an attaching-bolt extending upward through the channel-bar and secured on the upper side of the same, substantially as described.

6. The combination, with a harrow-frame provided with the channel draft-bars, each having its upper surface in substantially a single plane and intersecting cross-beams, of a curved spring-tooth engaging the vertical walls of the draft-bars on the under side of the frame at the intersection of the draft and cross beams, and a clip engaging the tooth between the walls of the channel-bar and holding the tooth, draft, and cross beams rigidly together, substantially as described.

7. In a harrow, the combination of the channel draft-bars having vertically-disposed walls depending from the same, the cross-beams, a spring-tooth mounted on the under side of the channel draft-bars at the intersection of the draft and cross beams, and an encircling clip with a bolt and nut for securing the tooth and frame together, substantially as described.

In testimony whereof I affix my signature in presence of two witnesses.

DEWITT C. MARKHAM.

Witnesses:
M. J. HOYT,
ROBT. M. JOHNSTON.